: 2,924,555
Patented Feb. 9, 1960

2,924,555

TWO-PHASE SYSTEM FOR CARRYING OUT ENZYMATIC REACTIONS

Elwyn T. Reese, Cochituate, Mass.

No Drawing. Application March 11, 1959
Serial No. 798,791

20 Claims. (Cl. 195—116)

(Granted under Title 35, U.S. Code (1952), sec. 266)

The invention described herein, if patented, may be manufactured and used by or for the Government for governmental purposes, without the payment to me of any royalty thereon.

This invention relates to enzymatic reactions, and more particularly to continuous reactions wherein a substance undergoes a chemical reaction under the catalytic influence of an enzyme, in a two-phase system characterized by the use of a selective solvent technique.

Batch-type and continuous enzymatic reactions have been used since ancient times, although their nature is even now not quite fully understood. They have assumed increased technological importance in modern chemical industry, far beyond the scope of classical fermentation processes. Due to the much greater complexity of the structure of an enzyme, as compared with the chemical structure of inorganic catalysts, enzymatic reactions present difficulties of control. It is particularly difficult, and has heretofore been largely considered impractical, to recover intermediate products of an enzymatic reaction, as departures from experimentally established optimum conditions for an enzymatic reaction merely result in decreased yields, but not in the formation of recoverable intermediate products.

It has been recently proposed to improve the technique of enzymatic reactions by adsorbing an enzyme on an adsorbent carrier and to pass a solution of the substance which is to be acted on by the enzyme, through the enzyme-carrying adsorbent. Such a process is workable, but slow, and results in a comparatively large expenditure of enzymatic material.

I have now found that a continuous enzyme-catalyzed reaction can be carried out efficiently by using different selective solvent systems for the enzyme and for the substance which is to be acted on by the enzyme. Generally, the enzyme is dissolved in a first solvent, and the solution thus formed is employed as a stationary phase. The substance to be acted on by the enzyme is dissolved in a second solvent which is either immiscible or at most limitedly miscible with the first solvent. This second system is passed through the enzyme-containing stationary phase as a mobile phase, e.g. (though not necessarily) in a column. Diffusion of the substances dissolved in the mobile phase takes place from the mobile phase into the stationary phase and into reactive contact with the enzyme, and the reaction product is again diffused into the mobile phase and carried away from the stationary phase. Evidently, such a procedure is eminently suitable for a continuous process, wherein additional amounts of substrate in the mobile phase are supplied to the stationary phase as the reaction proceeds.

The use of selective solvent systems is known in analytical laboratory techniques, e.g. in a method known as partition chromatography, wherein a mixture of solutions is analyzed by selective use of the characteristics of solvent systems. However, this technique has not heretofore been applied to enzymatic reactions.

Accordingly, it is a principal object of my invention to provide a more effective method for continuously transforming various substrates into intermediate and final products under the influence of enzymes.

Another object of the invention is to provide a method for the continuous transfer of glycosyl groups of hydrolyzable glycosides under the influence of glycosidases.

A further object of the invention is a method of continuous enzyme action in which the products are obtained free of the enzyme used to produce them.

Another object of my invention is a continuous enzyme-catalyzed reaction by the use of a stationary phase and mobile phase, wherein mutually immiscible or nearly immiscible solvent systems of appropriate solvent characteristics are employed so as to effect diffusion under optimum reaction conditions.

Still other objects of my invention are economy and certainty of operation, and the use of simple chemical apparatus and techniques familiar to the working chemist.

Yet other objects and advantages of my invention will readily occur to the expert from a study of the following description of the practice of my invention.

In accordance with the preferred manner of practicing my invention, the substrate is dissolved in a non-aqueous organic solvent having no or at most limited miscibility with water, and the solution is passed over a column of hydrophilic solids on which is located an aqueous solution of the enzyme specific for said substrate. There is a continuous partitioning action by which the substrate diffuses from the solvent into the aqueous phase, and the reaction products diffuse from the aqueous phase back into the organic solvent. The rate of the reaction is controlled by the rate at which the solution is allowed to percolate through the column, as well as by other physical factors affecting enzyme reactions. The pH of the aqueous phase is adjusted, by the addition of a small amount of buffer to the optimum for the action of the particular enzyme; as is well known to the workers in the art, there is an optimum pH as well as a pH range corresponding to any particular enzymatic reaction, which pH values are well known to the art and do not form a part of my invention.

As the products percolate through the column from the top down, separation is achieved because of their differences in solubility in the respective solvent systems. The reaction product or products collected in the mobile phase after completion of the enzyme-catalyzed reaction in the stationary phase may be further concentrated and purified by usual chemical procedures.

The enzyme is usually placed at the top of the column in a restricted zone. This restriction is desirable when attempting to obtain intermediates since otherwise the intermediates would then come into contact with other enzymes further down the column. When only final products of the reaction are desired, the enzyme need not be restricted to a narrow zone and the operation of the column may be speeded up by distributing the enzyme in a much wider band.

The continuous operation of a column depends upon the stability of the enzyme. The enzyme remains stable for a period of at least 30 days under appropriate conditions. This stability of enzyme is important for a continuous process.

The fact that the enzyme remains on the column while the products pass through the column is important, especially where the production of intermediate products is concerned. It is this freedom from enzyme which permits the accumulation of intermediate products, and which further distinguishes the continuous method described in this specification from conventional enzymatic batch processes.

In the selection of appropriate solvents systems for the stationary and mobile phases, the following general considerations apply:

Water is preferred as a solvent for the enzyme, though other compatible solvents are not excluded. The solvent for the substrate (substance to be acted on by the enzyme) must be selected from solvents which are immiscible or but limitedly miscible with the water or other solvent in which the enzyme is dissolved, and must be a non-solvent for the enzyme itself; the latter property avoids the washing away of the enzyme of the stationary phase by the solvent of the mobile phase. When water is the solvent for the stationary phase, appropriate solvents for the mobile phase are organic solvents such as alcohols having four or more carbon atoms in the molecule, e.g. n-butyl alcohol, isobutyl alcohol, sec-butyl alcohol, or tert-amyl alcohol, whose miscibility with water ranges from a few percent down to zero. In other words, to be effective, the enzyme must not be appreciably soluble in the organic solvent phase; substrate and reaction products must be reasonably soluble in both phases; and the solvent phase should not approach a solubility in the aqueous phase to the extent that the enzyme might be damaged or precipitated. Where co-factors are required for the action of the enzyme it may be necessary to supply these in the solvent phase with the substrate.

When water is the solvent for the enzyme-containing stationary phase, I prefer to form a column for the stationary phase by means of arranging a hydrophilic substance such as pure cellulose in a vertical tube so as to retain the stationary phase in place; the cellulose in water may be poured as a slurry into the solvent phase in the column. In this, however, I do not utilize any principle of adsorption, inasmuch as the enzyme solution can be readily eluted from the system by water-flushing, when desired. Other suitable systems of forming a column for the stationary phase are confined glass beads, through which the mobile phase is passed as fine droplets, or though less efficiently, even a retention of the stationary phase on the inner wall of a tube by mere surface tension.

Having thus discussed several general principles on which my invention is based, I now proceed to illustrate its practice by means of several examples without, however, limiting the scope of my invention to any specific details set forth.

*Example I*

A column was prepared as follows: An aqueous phase of pH 5.4 was provided in the form of a .01 M citrate buffer solution. This aqueous phase was shaken with n-butanol and allowed to stand overnight so that both phases became mutually saturated. Purified wood cellulose ("Solka floc," manufactured by Brown Co.), which is a hydrophilic substance, was added as a slurry in the aqueous phase to provide a stationary phase and dropped into the column containing some of the organic solvent phase. After packing, the column was washed with the solvent phase and had the dimensions 80 x 15 mm.

1.0 ml. of beta-glucosidase preparation (from *Aspergillus luchuensis* QM 873) containing 56 salicinase units per ml., was introduced to the top of the column. (One salicinase unit produces 4.0 mg. of glucose from 15 mg. of salicin in 10 ml. of citrate buffer at pH 5.4 in one hour at 50° C.) This was further washed with n-butanol. The substrate, salicin (90 mg. in 45 ml. of n-butanol) was passed down through the column as the mobile phase in 7 hours at room temperature. 74% of the substrate was split by the enzyme. Of the glucosyl groups transferred, 24% was transferred to water to form glucose, and 76% transferred to n-butanol to form a glucoside, n-butyl-beta-glucoside.

*Example II*

Example I was repeated, substituting cellobiose (glucose-beta-glucoside) in lieu of salicin. 83% hydrolysis took place, and about 77% of the hydrolyzed glucosyl groups of the cellobiose combined with the n-butyl radical of the solvent for the mobile phase, to form a glucoside, n-butyl-beta-glucoside. The remainder (23%) of the hydrolyzed glucosyl groups formed glucose.

*Example III*

Example I was repeated by substituting methyl-beta-glucoside for salicin, using isobutyl alcohol for the mobile phase. Isobutyl-beta-glucoside and glucose were formed by enzymatic action and glucosyl group transfer.

*Example IV* p-Nitrophenyl-beta-glucoside was dissolved in isobutyl alcohol to form a mobile phase, and was passed through the column as in Example I. 40% hydrolysis took place, and 42% of the hydrolyzed glucosyl groups combined with the isobutyl radical of the solvent to form isobutyl-beta-glucoside.

*Example V*

1 ml. of invertase was added to the top of a column of "Solka floc" prepared as in Example I. The invertase was a commercial preparation (Nutritional Biochemical Company) containing 1430 units per ml. (One invertase unit is the amount of enzyme causing 50% hydrolysis of 2 ml. of 0.10% sucrose at pH 5.4, in 30 minutes at 40° C.) The substrate, sucrose (65 mg. in n-butanol), was passed through the column at room temperature in 1½ hours. The substrate was completely hydrolyzed, yielding predominantly glucose and fructose with a small amount (about 5%) of a fructoside, n-butyl-beta-fructoside.

My invention is not limited to the above-mentioned enzymes, but may also be applied to reactions involving the use of other enzymes, under proper conditions.

Other hydrophilic solids which may be employed in place of "Solka floc" are other cellulosic materials, and other materials, e.g. "Celite" (amorphous silica), which do not adsorb the enzymes in such a way that they become ineffective.

Solvents other than the alcohols mentioned in the examples above may be used, provided that the substrates and the products are sufficiently soluble therein and that they are immiscible or nearly immiscible with water.

The choice of apparatus is not limited to columns; but other systems, such as the Craig countercurrent distribution apparatus, an instrument used in partition analysis, may be used.

My invention may also be applied to the hydrolysis or other enzymatic changes of other carbohydrates, of fats and other lipids, of proteins, and indeed of any substrate susceptible to enzyme action.

It will thus be seen from the foregoing description of my invention and of several examples for carrying the same into practice, that an enzyme which remains free in the aqueous phase is capable of carrying out a wide variety of hydrolytic and other enzymatic actions on carbohydrates, lipids and other enzymatic hydrolyzable substances, and acts as a result of the diffusion of the substrate from the mobile to the stationary phase and diffusion back of the reaction product to the mobile phase.

Adaptation of numerous enzyme systems for use in my invention will be readily apparent to the experts in the fields of applied chemistry and enzyme biology, without departing from the principles of my invention. I desire to encompass such changes and adaptations within the scope of my invention, and to that end define the same by the appended claims.

I claim:

1. Method of carrying out an enzymatic reaction, comprising dissolving an enzyme in an aqueous phase, retaining said aqueous phase on a hydrophilic solid as the stationary phase, dissolving a substrate in a non-aqueous solvent having not more than limited water solubility and in which said enzyme is not substantially soluble, passing said non-aqueous solvent phase as a mobile phase through said stationary aqueous phase, whereby said substrate diffuses from said non-aqueous solvent phase into said aqueous phase into reaction with said enzyme, and separating the reaction product of said enzyme and substrate from said aqueous phase by diffusing said reaction product into said non-aqueous mobile phase.

2. Method according to claim 1, wherein said hydrophilic solid is cellulose.

3. Method of carrying out a continuous enzymatic reaction, comprising dissolving an enzyme in an aqueous phase, retaining said aqueous phase on a hydrophilic solid as the stationary phase, dissolving a substrate in a non-aqueous solvent having not more than limited water solubility and in which said enzyme is not substantially soluble, continuously passing said non-aqueous solvent as a mobile phase through said stationary phase, whereby said substrate diffuses from said non-aqueous solvent phase into said aqueous phase into reaction with said enzyme, separating the reaction product of said enzyme and substrate from said aqueous phase by diffusing said reaction product into said non-aqueous mobile phase, and continuously conducting the non-aqueous mobile phase, in which said reaction product is dissolved, away from said stationary phase while passing additional amounts of substrate dissolved in said non-aqueous solvent to said stationary phase.

4. Method of carrying out a continuous enzymatic reaction, comprising dissolving an enzyme in an aqueous phase, retaining said aqueous phase on a hydrophilic solid as the stationary phase, in a column, dissolving a substrate in a non-aqueous solvent having not more than limited water solubility and in which said enzyme is not substantially soluble, introducing said non-aqueous solvent phase as a mobile phase to the top of said column, whereby said substrate diffuses from said non-aqueous solvent phase into said stationary aqueous phase in said column and reacts with said enzyme, diffusing the reaction product of said enzyme and substrate into said non-aqueous mobile phase and separating it from said column at the bottom thereof.

5. Method of carrying out a continuous enzymatic reaction, comprising forming a stationary aqueous phase of an enzyme in a column by dissolving said enzyme in an aqueous phase and mechanically retaining said aqueous phase in said column, dissolving a substrate in a non-aqueous solvent having not more than limited water solubility and in which said enzyme is not substantially soluble, passing said non-aqueous solvent phase as a mobile phase through said stationary aqueous phase, whereby said substrate diffuses from said solvent phase into said aqueous phase into reaction with said enzyme, and separating the reaction product of said enzyme and substrate from said aqueous phase by diffusing said reaction product into said non-aqueous mobile phase and conducting said non-aqueouse mobile phase, in which said reaction product is dissolved, away from said stationary phase and column.

6. Method of hydrolysis of enzymatic action, comprising dissolving an enzyme in an aqueous phase, mechanically confining said aqueous phase to form a stationary phase, dissolving a hydrolyzable substance in a non-aqueous solvent having not more than limited water solubility in which said enzyme is not substantially soluble, passing said non-aqueous phase as a mobile phase through said stationary phase, whereby said hydrolyzable substance diffuses from said non-aqueous solvent phase into said aqueous phase and is hydrolyzed by said enzyme, and separating the hydrolysis product by diffusion in said mobile phase being conducted away from said stationary phase.

7. Method according to claim 6, wherein said aqueous phase is retained by a hydrophilic substance.

8. Method according to claim 7, wherein said hydrophilic substance is cellulose.

9. Method according to claim 7, wherein said stationary phase forms a column.

10. Method according to claim 6, wherein said enzyme is a glycosidase and wherein said hydrolyzable substance is a glycoside.

11. Method according to claim 6, wherein said enzyme is a glucosidase and wherein said hydrolyzable substance is a glucoside.

12. Method according to claim 11, wherein said non-aqueous solvent is an alcohol having at least four carbon atoms in the molecule.

13. Method according to claim 12, wherein a glucosyl group formed in the hydrolysis of said glucoside combines with said alcohol to form an alkyl glucoside.

14. Method according to claim 6, wherein said enzyme is beta-glucosidase and wherein said hydrolyzable substance is a beta-glucoside.

15. Method according to claim 14, wherein said beta-glucoside is salicin.

16. Method according to claim 6, wherein said enzyme is invertase and wherein said hydrolyzable substance is sucrose.

17. Method according to claim 16, wherein said non-aqueous solvent is an alcohol having at least four carbon atoms in the molecule.

18. Method according to claim 17, wherein a fructosyl group formed in the hydrolysis of said sucrose combines with said alcohol to form an alkyl fructoside.

19. Continuous method of carrying out an enzymatic reaction, comprising forming a stationary phase of an enzyme dissolved in a first solvent, dissolving in a second solvent a substance capable of being acted on by said enzyme, said second solvent being substantially immiscible with said first solvent, and said second solvent having substantially no solvent action on said enzyme, passing said second solvent and said substance dissolved therein as a mobile phase through said stationary phase, whereby said substance diffuses from said mobile phase into said stationary phase and is acted on by said enzyme, and separating the product of the action of said enzyme on said substance from said stationary phase by diffusing said product in said mobile phase and conducting it away from said stationary phase in said mobile phase while passing additional amounts of mobile phase through said stationary phase.

20. Method according to claim 19, wherein said stationary phase is arranged in a column, and wherein said mobile phase is supplied to the top of said column.

References Cited in the file of this patent

UNITED STATES PATENTS 2,717,852    Stone _____ Sept. 13, 1955